United States Patent
Ming

(10) Patent No.: US 8,045,193 B2
(45) Date of Patent: Oct. 25, 2011

(54) AUTOMATIC DETECTION OF USER PREFERENCE FOR COPY OR SCAN SETTING

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1070 days.

(21) Appl. No.: 11/688,323

(22) Filed: Mar. 20, 2007

(65) Prior Publication Data

US 2008/0231880 A1 Sep. 25, 2008

(51) Int. Cl.
*G06F 15/00* (2006.01)
*G06K 9/00* (2006.01)

(52) U.S. Cl. .................................. 358/1.14; 382/100

(58) Field of Classification Search ............... 358/1.14, 358/1.15, 1.16, 1.18, 462, 302, 1.12, 3.29; 382/100, 162, 154, 167; 725/39, 113; 709/203, 709/219, 217; 235/462.7, 380, 375, 454; 455/556.1, 458

See application file for complete search history.

(56) References Cited

U.S. PATENT DOCUMENTS

| 2003/0167336 A1* | 9/2003 | Iwamoto et al. ............... 709/229 |
| 2005/0097046 A1 | 5/2005 | Singfield |
| 2006/0181727 A1* | 8/2006 | Numata et al. ............... 358/1.14 |
| 2007/0038313 A1* | 2/2007 | Bridges et al. ............... 700/17 |

FOREIGN PATENT DOCUMENTS

JP 61-236537 10/1986

* cited by examiner

*Primary Examiner* — Saeid Ebrahimi Dehkordy
(74) *Attorney, Agent, or Firm* — Chen Yoshimura LLP

(57) ABSTRACT

A method is described for automatically predicting user-preferred copy or scan settings based on past user behavior. The method is implemented in a management section of a copier, scanner, or multifunction devices that combine copy, scan and print functions, or on a server connected with such a device. The management section maintains a copy/scan/user (CSU) settings database that stores copy and/or scan settings associated with user IDs. Each time a copy or scan job is initiated, the management section analyzes the CSU database to determine a predicted user-preferred setting. The user may manually change the setting and confirm it, and the management section stores the user confirmed setting in the CSU database for future use. The CSU database may be transferred from one copier/scanner/multifunction device to another.

22 Claims, 2 Drawing Sheets

AUTOMATIC DETECTION OF USER PREFERENCE FOR COPY OR SCAN SETTING

BACKGROUND OF THE INVENTION

This invention relates to a method and software for managing copiers, scanners and/or multifunction devices, and in particular, it relates to a method used in or with copiers, scanners and/or multifunction devices for providing user-preferred settings.

SUMMARY

In conventional copiers, scanners, or multifunction devices (sometimes referred to as MFPs or AIOs (all-in-one devices), which are devices that combine copy, scan and print functions), users are allowed to set or change various copy and/or scan parameters and save the setting in the devices for future use. There remains a need for an intelligent way of managing user preference for copy and scan settings, especially in a multi-user environment, and a way of transferring user preference associated with one copier, scanner or MFP device to another.

Accordingly, the present invention is directed to a method for managing user preference for copy and/or scan settings in a copier, scanner or MFP device. The method may be implemented as a part of the management section or management software residing on the device or a networked server.

An object of the present invention is to automatically predict user-preferred copy and/or scan settings.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for controlling an image reproduction device (copier, scanner or multifunction device), which includes: (a) obtaining a first user ID associated with a user of the image reproduction device; (b) determining a predicted user-preferred setting for the image reproduction device associated with the first user ID by analyzing a settings database, the settings database containing one or more copy or scan settings each associated with a user ID; (c) allowing the user to optionally change and confirm the predicted user-preferred setting; (d) updating the settings database using the confirmed setting and the first user ID; and (e) performing copying or scanning using the confirmed setting.

In another aspect, the present invention provides a computer program product that causes a data processing system including an image reproduction device to perform the above method.

In yet another aspect, the present invention provides an image reproduction device, which includes: a scanning section for generating digital image data by scanning a physical medium; a user interface for receiving input from a user and displaying information to the user; a memory for storing a settings database containing one or more copy or scan settings each associated with a user ID; and a management section for determining a predicted user-preferred setting for the image reproduction device associated with a first user ID by analyzing the settings database, for allowing the user to optionally change and confirm the predicted user-preferred setting using the user interface, and for updating the settings database using the confirmed setting and the first user ID. The image reproduction device may further include a printing section for forming an image on a physical medium from digital image data.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a copy and/or scan setting management method implemented in a management section for a copier, scanner or multifunction device (often referred to as MFP or AIO (all-in-one), which a device that combines copy, scan and print functions), or on a networked server accessible by the copier, scanner or MFP. According to this method, the management section of the copier, scanner or MFP automatically gathers user preference information with respect to copy and/or scan settings, and applies that information to provide a predicted user-preferred copy or scan setting. Here, a copy or scan setting refers to a set of parameters used by a copier, scanner or MFP to control the copy or scan function of the device. A commonly owned, co-pending U.S. patent application Ser. No. 11/680,508, filed Feb. 28, 2007, entitled "Automatic Detection of User Preference for Printer Setting," describes a method for automatically detecting user preference for managing printer settings implemented on a data processing system that includes a printer. Embodiments of the present invention are primarily concerned with copy and scan functions of a copier, scanner or multifunction device. For ease of reference, in this disclosure, the term "image reproduction device" is used to refer to a copier, a scanner, a multifunction device (synonymous with an all-in-one device in this disclosure), or any other device that includes either a copy or a scan function.

According to an embodiment of the present invention, a management section of the image reproduction device maintains a copy/scan/user settings database (referred to as the CSU database in this disclosure) which records copy and/or scan settings that users have used in the past. Each entry in the CSU database records a copy or scan setting associated with a user ID. The CSU database is accessed and analyzed by the management section to predict a user-preferred setting for a copy or scan job.

Figure 2:
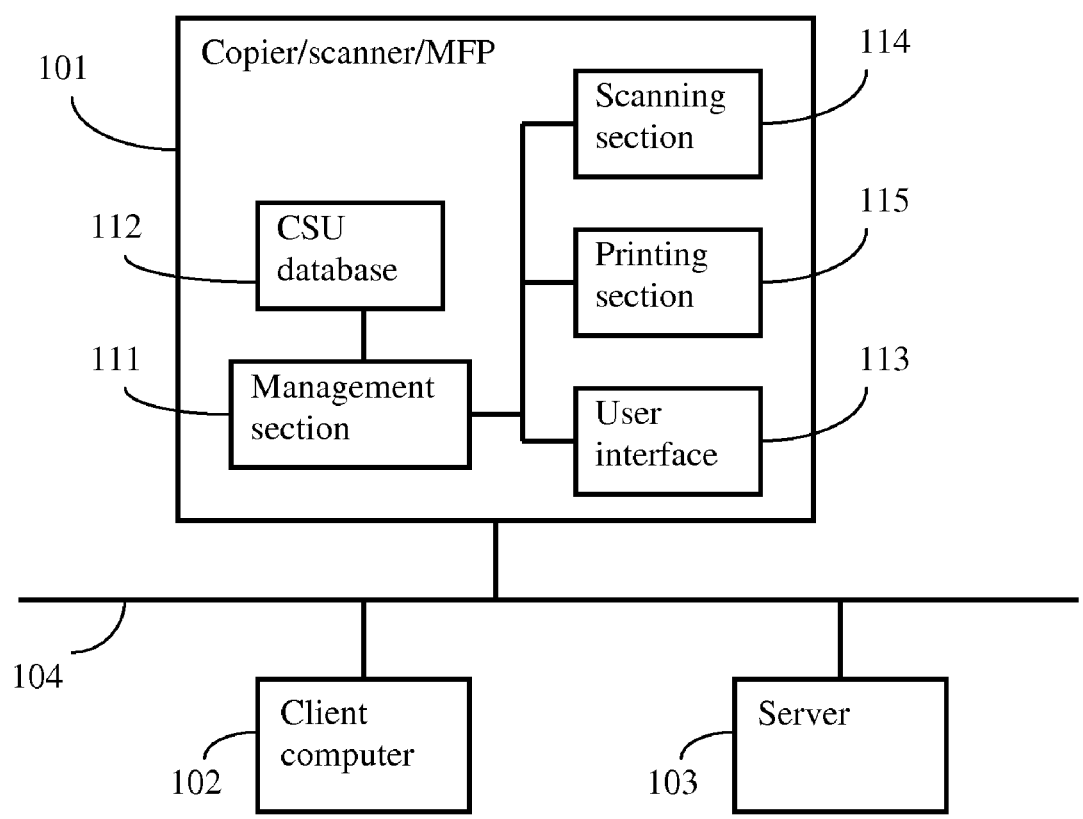
FIG. 2 schematically illustrates a copier, scanner or MFP in which a copy and/or scan setting management method according to embodiments of the present invention may be implemented.

FIG. 2 schematically illustrates a data processing system in which the copy and/or scan setting management method according to embodiments of the present invention is implemented. The data processing system includes an image reproduction device 101, which may be a copier only device, a scanner only device, a multifunction device that combines copy, scan and print functions, or any other device that includes either a copy or a scan function. The image reproduction device 101 may be optionally connected to one or more client computers 102 and/or one or more servers 103 by a network 104. It may alternatively be connected to a client computer or server by a direct connection such as a cable (not shown). The image reproduction device 101 includes a management section 111, implemented by hardware, software or firmware, that performs the copy and/or scan setting management function. The management section 111 maintains and updates the CSU database 112 stored in the device 101. A user interface 113, such as a control panel including buttons, a display screen, a touch screen, a full keyboard, and/or other suitable mean is used for receiving input from a user and displaying information to the user. The user may view the current setting and enter or change setting parameters via the user interface 113. The image reproduction device 101 also includes a scanning section 114 for generating digital image data by scanning a physical medium (e.g. paper) and optionally a printing section 115 for forming an image on a physical medium from digital image data. A scanner only device will not include a printing section, while a copier device or a MFP will include both a scanning section and a printing section. Although not shown, the image reproduction device 101 also includes necessary memories, an I/O section, additional control sections, additional processing sections to perform image processing function (optional), or other components. The user interface 113, scanning section 114, printing section 115, memory, I/O, control sections and addition processing sections, if any, are components commonly found in conventional copiers, scanners and MFPs.

While the CSU database 112 is shown in FIG. 2 as residing on the image reproduction device 101, if the device is connected to a network, the CSU database may alternatively reside on a remote server 103 connected to the network. Using such a configuration, when multiple image reproduction devices are connected to the same network, which is often the case in large organizations, the same CSU may be shared by the multiple devices. In such a case, if the multiple image reproduction devices in the network include multiple models or classes of devices (e.g. similar models made by the same manufacturer may be considered the same class of devices due to similarities in the setting parameters they employ), the CSU database will include information specific to each model or class of devices. In other words, each entry in the CSU database will additionally include a parameter indicating the model or class of the device which the setting is associated with.

In addition, while the management section 111 is shown in FIG. 2 as residing on the image reproduction device 101, if the device is connected to a network, the management section may alternatively reside on a remote server 103 connected to the network. A communication section of the image reproduction device receives user inputs and communicates with the server, and the management section of the server acts as a copy/scan service to provide predicted user-preferred settings to the image reproduction device.

Figure 1:
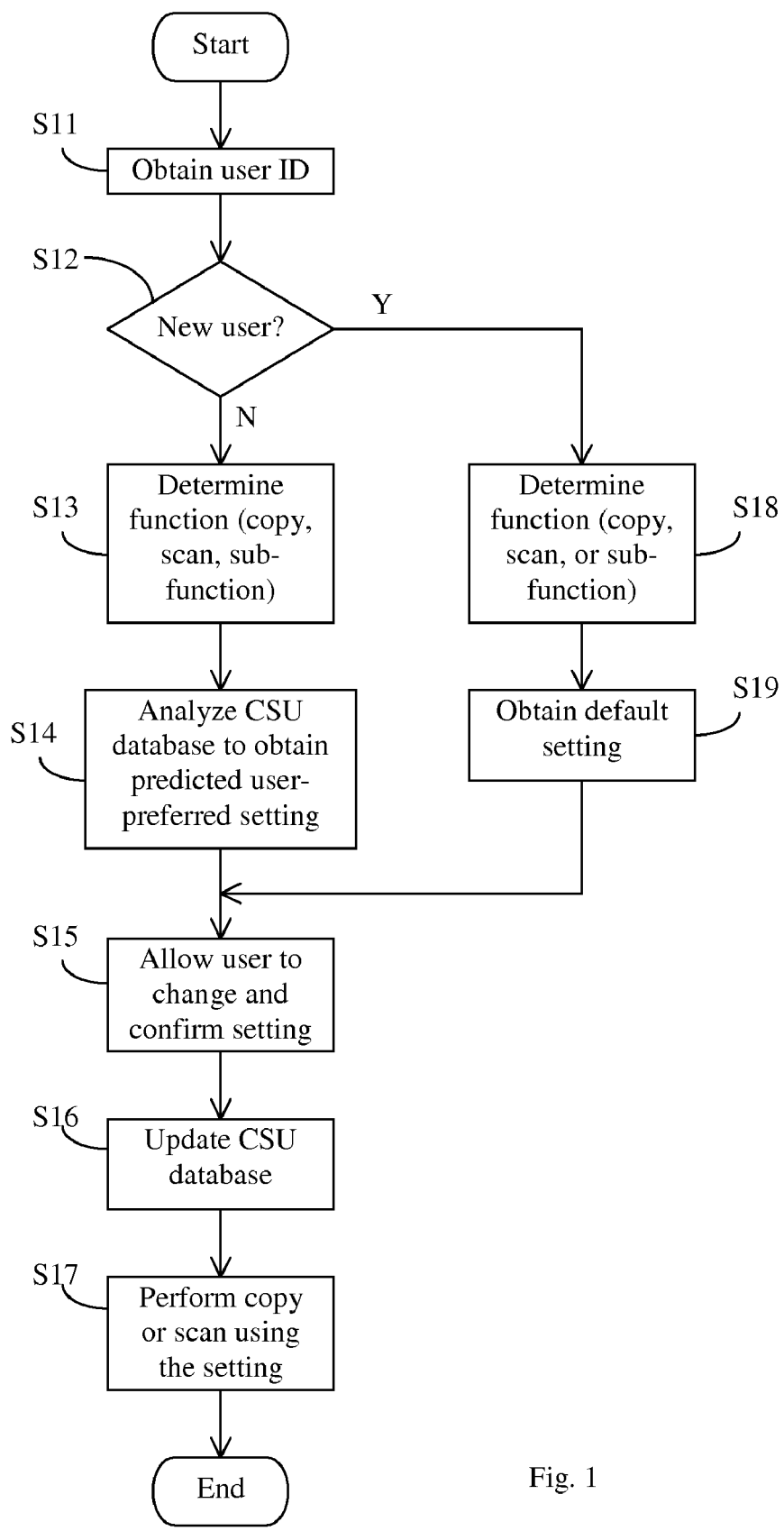
FIG. 1 illustrates a copy and/or scan setting management method for a copier, scanner or MFP according to an embodiment of the present invention.

FIG. 1 illustrates a copy and/or scan setting management method according to an embodiment of the present invention. A MFP device is used as an example, but the method can also be implemented on a copier only or scanner only device. As shown in FIG. 1, each time a copy or scan job is initiated, the management section obtains the user ID from a logon procedure (step S11). If the user is an existing user, i.e., the user ID is associated with one or more CSU database entries ("N" in step S12), the management section determines the function to be performed by the device as specified by the user (step S13). The function may be simply copy or scan; alternatively, the management section optionally allows the users to define specialized sub-functions for different purposes. For example, a user may define "smooth copy" or "contrast copy" sub-functions, which may be used for copying photographs and graphics, respectively. The sub-functions may be defined by a user using the user interface, and definitions of the sub-functions are stored in the CSU database. Thus, the function determined in step S13 may be copy, scan, or one of sub-functions. Step S13 is omitted if the device is a copier only or scanner only device and the user has not defined any sub-functions. The management section then analyzes the CSU database entries to determine a predicted user-preferred setting for the function (step S14).

The prediction in step S14 may be based on various criteria, such as frequency of past use. A knowledge-based approach may also be used, where correlations among copy or scan attributes (i.e. the setting parameters) are taken into consideration. For example, in the case of copy, when the image mode is selected as photo, then the screen pattern is more likely to be gradation, the glossy mode to be on, and the duplex to be off. When the image mode is text, the screen pattern is more likely to be resolution, the glossy mode to be off, the background to be lighter, the density to be darker, and the staple to be on, etc.

The predicted user-preferred setting is preferably displayed to the user using the user interface. The user is allowed to manually change the setting using the user interface if desired, and confirm the setting (step S15). The management section updates the CSU database using the confirmed setting and the user ID, as well as the associated function (including sub-function) if specified (step S16), and proceeds to perform the copy or scan using the confirmed setting (step S17). In the database updating step S16, the setting confirmed by the user may be added as a new database entry, or alternatively, an existing database entry may be modified. For example, if an entry already exists for the same setting as the user has used the same setting in the past, the CSU database may be updated by modifying the frequency of use information associated with that setting. In such an implementation, each entry in the CSU database additionally contains a frequency value indicating the frequency of use associated with the particular setting, and the frequency value is updated each time the same setting is used. When a function (including sub-function) is associated with the settings, it is also recorded as a part of the database entry.

In step S12, if the management section determines that the user is a new user ("Y" in step S12), i.e., no entry corresponding to this user ID exists in the CSU database, the management section determines the function to be performed as specified by the user (step S118) (omitted if the device is a copier only or scanner only device), and obtains a pre-stored default setting (step S19). The user is allowed to manually change the default setting using the user interface if desired, and confirm the setting (step S15). The management section updates the CSU database (step S16) by adding the confirmed setting to the database as a new entry associated with the user ID, and proceeds to perform the copy or scan function (step S17). Although not shown in FIG. 1, if a CSU database does not already exist on the image reproduction device, the management section creates such a database.

As stated earlier, the management section 111 may reside on a remote server 103 as a copy/scan service. In such a configuration, steps S11 through S16 will be performed by the copy/scan service on the server. Thus, step S12, S13 and S15 will include communicating with the image reproduction device to obtain the user ID, to determine the function, and to receive change or confirmation, respectively.

The user preference data, in the form of the CSU settings database, may be transferred from one image reproduction device to another. The CSU database may be transferred from the first image reproduction device to a computer which is connected to the first device either directly or via a network, and then transferred from the computer to the second image reproduction device which is connected to the computer either directly or via a network. If both image reproduction devices are connected to a network, the CSU database may be transferred directly from one device to the other over the network. Alternatively, two image reproduction devices may be directly connected to each other and the CSU database may be transferred between them directly without using a computer. As another alternative, a passive memory device such as a USB memory devices or other memory cards may be used to transfer the CSU database if the image reproduction devices are equipped with a drive to read and write such memory devices.

From the above descriptions, it can be seen that the user preference detection method described above functions to automatically predict user preference in copy or scan settings in an image reproduction device. By using this method, the user can avoid manually entering complicated setting for every copy or scan job. The method also functions to transfer user-preferred settings from one image reproduction device to another.

It will be apparent to those skilled in the art that various modification and variations can be made in the user preference detection and copy or scan setting management method of the present invention without departing from the spirit or scope of the invention. Thus, it is intended that the present invention cover modifications and variations that come within the scope of the appended claims and their equivalents.

What is claimed is:

1. A method for controlling an image reproduction device, comprising:
   (a) obtaining a first user ID associated with a user of the image reproduction device;
   (b) determining a predicted user-preferred setting for the image reproduction device associated with the first user ID by analyzing a frequency of past uses of the setting stored in a settings database, the settings database containing one or more copy or scan settings recorded from users' past uses, each setting associated with a user ID and a frequency value indicating the frequency of past uses;
   (c) allowing the user to optionally change and confirm the predicted user-preferred setting;
   (d) updating the frequency value in the settings database using the confirmed setting and the first user ID; and
   (e) performing copying or scanning using the confirmed setting.

2. The method of claim 1, further comprising:
   before step (b), determining a function to be performed by the image reproduction device,
   wherein in step (b), the determination of the predicted user-preferred setting is based on the function to be performed, and
   wherein each copy or scan setting in the database is associated with a function.

3. The method of claim 2, wherein the function is a copy function.

4. The method of claim 2, wherein the function is a scan function.

5. The method of claim 2, wherein the function is a specialized copy or scan function.

6. The method of claim 1, wherein in step (b) the predicted user-preferred setting is determined based on correlations among setting parameters.

7. The method of claim 1, wherein step (b) comprises:
   if the settings database contains no setting associated with the first user ID, using a default setting as the predicted user-preferred setting.

8. The method of claim 1, further comprising: before step (a), creating the settings database.

9. The method of claim 1, further comprising: transferring the settings database to or from the image reproduction device.

10. The method of claim 1, wherein the image reproduction device is a copier.

11. The method of claim 1, wherein the image reproduction device is a scanner.

12. The method of claim 1, wherein the image reproduction device is a multifunction device.

13. The method of claim 1, wherein each copy or scan setting in the settings database is further associated with a parameter indicating a model or class of the image reproduction device.

14. An image reproduction device, comprising:
   (a) a scanning section for generating digital image data by scanning a physical medium;
   (b) a user interface for receiving input from a user and displaying information to the user;
   (c) a memory for storing a settings database containing one or more copy or scan settings recorded from users' past uses, each setting associated with a user ID and a frequency value indicating a frequency of past uses; and
   (d) a management section for determining a predicted user-preferred setting for the image reproduction device associated with a first user ID by analyzing the frequency of past uses of the setting stored in the settings database, for allowing the user to optionally change and confirm the predicted user-preferred setting using the user interface, and for updating the frequency value in the settings database using the confirmed setting and the first user ID.

15. The image reproduction device of claim 14, further comprising a printing section for forming an image on a physical medium from digital image data.

16. The image reproduction device of claim 15, wherein the management section further determines a function to be performed by the image reproduction device, wherein the predicted user-preferred setting is determined based on the function to be performed, and wherein each copy or scan setting in the database are associated with a function.

17. A computer program product comprising a non transitory computer usable medium having a computer readable code embodied therein for controlling a data processing system including an image reproduction device, the computer readable program code configured to cause the data processing system to execute a process comprising the steps of:
   (a) obtaining a first user ID associated with a user of the image reproduction device;
   (b) determining a predicted user-preferred setting for the image reproduction device associated with the first user ID by analyzing a frequency of past uses of the setting stored in a settings database stored in the image reproduction device, the settings database containing one or more copy or scan settings recorded from users' past uses, each setting associated with a user ID and a frequency value indicating the frequency of past uses;
   (c) allowing the user to optionally change and confirm the predicted user-preferred setting; and
   (d) updating the frequency value in the settings database using the confirmed setting and the first user ID.

18. The computer program product of claim 17, wherein the process further comprises:

before step (b), determining a function to be performed by the image reproduction device, wherein in step (b), the determination of the predicted user-preferred setting is based on the function to be performed, and wherein each copy or scan setting in the database is associated with a function.

19. The computer program product of claim 18, wherein in step (b) the predicted user-preferred setting is determined based on correlations among setting parameters.

20. The computer program product of claim 17, wherein step (b) comprises:

if the settings database contains no settings associated with the first user ID, using a default setting as the predicted user-preferred setting.

21. The computer program product of claim 17, wherein the process further comprises: before step (a), creating the settings database.

22. The computer program product of claim 17, wherein each copy or scan setting in the settings database is further associated with a parameter indicating a model or class of the image reproduction device.

* * * * *